UNITED STATES PATENT OFFICE.

JAMES E. JEFFERIES, OF YEO BANK, CONGRESBURY, ENGLAND.

COMPOSITION PRINTING-BLOCK.

SPECIFICATION forming part of Letters Patent No. 231,491, dated August 24, 1880.

Application filed April 3, 1880. (No model.) Patented in England August 22, 1879.

*To all whom it may concern:*

Be it known that I, JAMES EVAN JEFFERIES, a subject of the Queen of Great Britain, residing at Yeo Bank, Congresbury, in the county of Somerset, England, have invented certain new and useful improvements in producing printed matter, and in the reproduction of written, drawn, or printed matter or patterns otherwise produced, and in appliances to be used for these purposes, for which I have received Letters Patent in England, No. 3,391, dated the 22d day of August, 1879; and I do hereby declare that the following is a full, clear, and exact description of the invention, which will enable others skilled in the art to which it appertains to make and use the same.

For producing printed matter or designs I use a printing bed or block composed of elastic absorbent materials combined with aniline or other such like inks or dyes, and such parts of the surface of the printing bed or block as are not required to give off color to the paper or other substance to be printed on I coat with bronze-powder or other substance which will prevent the passage of color from the bed or block to paper or material laid onto the block or against which the block is pressed.

The elastic porous material may be a compound of treacle and glue, similar to that commonly used in forming the inking-rollers of printing-machines, or a compound of gelatine and glycerine, or other such like moist porous elastic compounds capable of holding aniline or other such like inks or dyes, many such compounds being now well known. Blocks of such porous or absorbent material are hereinafter called "composition" or "compo" blocks.

The best way of charging the compounds with the inks or dyes is to melt the compounds by applying heat to them, and then stir in with them the dye previously dissolved in spirit or in water, or the color or dye may be applied in other ways. Such portions of the surface of the bed or printing blocks as are not required to give off color I cover, as hereinafter described, with bronze-powder or other resist which will prevent the passage of color from the printing bed or block onto the paper or other substance that is being printed on; or such portions as are not required to give off color may be recessed below the other parts.

A great variety of ways may be used for covering with a resist those portions of the printing bed or block that are not required to print. For example, if it is required to print a number of copies of any written matter, I may first coat a sheet of paper with bronze-powder, the paper being first greased to cause the powder to adhere to it. On the surface of the paper so prepared I write with a pencil or other point. Where the point presses on the paper the bronze-powder is removed from it. The sheet of paper, with the prepared surface downward, is then laid onto the surface of the printing bed or block, and the surface of the bed or block thus becomes coated with bronze-powder, except in those places which are in contact with the parts of the paper that have been written upon. The paper is then lifted from the surface of the printing bed or block, which is then ready for printing from. The printing operation is conducted just in the same manner as when a soft porous composition bed is now used, having only such portions of its surface charged with aniline ink or dye as are required to print from; but by my process a far greater number of copies can be obtained than is possible by such old process, since in my process, the whole of the bed being charged with ink, the supply of ink for printing from is practically unlimited.

If powdered shellac or resinous resists are used in place of bronze-powder, such powdered resists, after being applied to the surface of the printing bed or block, may be caused to consolidate together by the application of heat. In this case it would be almost necessary to omit glycerine from the compo bed and to use water and gum in place of glycerine in the making up of the compo bed.

Another way is to coat the whole of the surface of the printing bed or block with Japan black or other resist, and afterward to etch away the resist from those portions of the surface where a pattern is to be created.

Another way of using resists in conjunction with composition beds or blocks of the kind above described is to coat any varied surface, such as lace-leaves or other articles, with the powdered resist, and then to press them onto the surface of a colored composition bed or block. The resist adheres to the surface of the bed or block, and when the lace or other article has been taken away prints may be taken from the surface of the printing bed or block onto paper or other material. The printed surface of the paper may be then dusted over with bronze-powder or other resist. The resist will adhere only to such portions of the paper as have previously received color from the color-printing bed. Afterward the paper, with its printed and prepared surface downward, may be laid onto the surface of another colored printing-block. The surface of this block thus becomes coated with resist wherever it is not required to print, and the block may then be used for printing any desired number of copies of the article from which the pattern was taken.

In some cases, when using a composition printing bed or block charged with color, as before explained, such portions of the surface as are not required to print may be etched away, or the surface of the block may, in the first instance, be formed with those parts only raised that are required to print.

The processes hereinbefore described are applicable not only when the surface of the printing-bed is a flat plane, but also when it is formed as a cylinder, which may be printed from in the ordinary manner of roller-printing. Printing-cylinders with two, three, four, or more flat sides may also be used, each side forming a separate printing face or surface.

The surface of the bed or block need not be used for printing direct onto paper. It might be used to print onto another composition bed or block or onto a great number of other beds or blocks, and these second blocks be used for printing onto paper or other surface, and such second blocks might be re-inked, either continuously or from time to time, by being brought into contact with the first block. If cylindrical blocks are used, they might be of the same diameter and be caused to revolve at a uniform speed in contact with one another. By thus using the original color bed or block, not to print directly onto the paper or other surface to be printed, but to print onto other previously uncolored beds or blocks, and using such second set of blocks for printing onto the paper or surface, a vast number of impressions may be obtained.

Composition color blocks or beds, such as hereinbefore described, whether in the form of rollers or as pads, I also use for inking type or other printing blocks or surfaces, in place of inking such surfaces with a fluid ink, as heretofore. If metal or wood type or printing-surfaces are used, I prefer to moisten the surface of the type or printing-surface with glycerine previous to passing the color-roller over them. I also prefer not to apply the color-roller direct to the type or printing-surfaces, but to convey the color from the color-roller to the type or printing-surface by another or other compo roller or rollers, which may be distributing-rollers. When the composition blocks or rollers are to be thus used for giving off color to the surface of type or to other printing-surface, I prefer to form them of glue or gelatine and glycerine, and add to these while they are melted aniline or such like dye dissolved in spirit, and also add to them flock, or it might be other substance, in a finely-powdered state to stiffen them. In many cases, also, I mix linseed or boiled oil with the other substances.

I also form stereo blocks or stamps from gelatinous and such like compositions charged with aniline or such like dye. The hollows of these stereo blocks or stamps I in some cases fill in with resist, or it might be a metal or other plate having the pattern cut through it. In this case the composition, while melted, may be cast onto the back of the plate, so that the composition shall pass through the openings in the plate and form a flat face level with the face of the plate. Such blocks, stamps, or printing-surfaces may be from time to time recharged with ink or dye by applying ink or dye, either under pressure or not, to the back of the composition.

The compo beds or blocks, in place of being charged with one color only, may be composed of a series of colored compo sheets about one thirty-second of an inch in thickness, or less, placed one over the other. Parts of the upper sheets may be etched away or removed, where required for pattern, and then prints in two or more colors can be obtained from the blocks; or the composition beds, in place of being charged with one color only, may be charged with several colors. In this case I first dissolve the inks or dyes in spirit and then mix each separate color with a portion of gelatine compounds previously heated and melted. While the colored compounds are hot and quite liquid I pour them into a shallow pan in adjacent parallel lines or strips, and then, as quickly as may be, comb them—that is, draw the points of a coarse comb through the composition crosswise of the lines, so as to alter the various-colored straight lines into varied patterns; or the bed or printing-block may be formed by sprinkling or splashing the several colors mixed with gelatinous compound onto a hot bath containing only gelatine in solution.

Printing-beds so formed may be used as flat printing-beds or may be fastened around a roller for roller-printing.

Having thus described my invention, I would state that I claim—

1. The hereinbefore-described composition printing bed or block, composed of the mixture or combination of the porous or absorbent elastic compound and the coloring ink or dye, substantially as hereinbefore set forth.

2. The printing bed or block consisting of the mixture or combination of the ordinarily-employed porous or absorbent elastic compound and an ink or dye such as specified, and having such parts of its surface as are not required to give off color covered or coated with a resist, substantially as hereinbefore set forth.

3. The hereinbefore-described method of producing color-printing beds or blocks, consisting in mixing the inks or dyes with a melted compound, such as the blocks or beds are usually composed of, substantially as hereinbefore set forth.

JAMES E. JEFFERIES.

Witnesses:
   THOMAS JARRETT,
   CHAS. WM. WHITE,
*Clerks to Arthur H. Wausey,*
   *Solicitor and Notary Public, Bristol.*